Sept. 28, 1948.　　　　M. N. YARDENY　　　　2,450,071
SYNCHRONOUS PRESET REMOTE CONTROL SYSTEM
Filed Nov. 23, 1944　　　　　　　　　　3 Sheets-Sheet 1

MICHEL N. YARDENY
INVENTOR

BY
ATTORNEY

Sept. 28, 1948.  M. N. YARDENY  2,450,071
SYNCHRONOUS PRESET REMOTE CONTROL SYSTEM
Filed Nov. 23, 1944  3 Sheets-Sheet 2

MICHEL N. YARDENY
INVENTOR

BY
Augustus M. Henry
ATTORNEY

Sept. 28, 1948.   M. N. YARDENY   2,450,071
SYNCHRONOUS PRESET REMOTE CONTROL SYSTEM
Filed Nov. 23, 1944   3 Sheets-Sheet 3

MICHEL N. YARDENY
INVENTOR.

BY Augustus M. Henry
ATTORNEY

Patented Sept. 28, 1948

2,450,071

UNITED STATES PATENT OFFICE 2,450,071

SYNCHRONOUS PRESET REMOTE CONTROL SYSTEM

Michel N. Yardeny, New York, N. Y.

Application November 23, 1944, Serial No. 564,868

5 Claims. (Cl. 318—33)

The invention relates to improvements in control apparatus for positioning a power driven useful load. It relates more particularly to control apparatus for placing a useful load in a selected one of several predetermined positions.

A feature of the invention is to provide means for controlling the position of the useful load solely by electrical means and hence from a remote control point when desired; there being provided a drive means for the load at the controlled point and a moving means for a control element of a control means at the control point which in turn controls the drive means without mechanical connection between the drive means and the moving means, but with a synchronizing means for insuring that successive positions of the drive means will correspond to successive positions of the moving means, whereby the load can be placed exactly in a selected predetermined position.

A resulting feature of the invention is that with the control means at a distance from the controlled point as above, means may be provided at the control point only, for moving one control element relative to another to preset the control means for establishing a desired predetermined stopping position for the drive means.

Further, according to the invention, an arrangement as just described may have incorporated therein additional control means, for placing the load in any desired position independent of any predetermined position, and with this second control means including independently movable control elements, one of which is moved by the above mentioned moving means.

These and other features, objects and advantages of this invention are more fully described in the accompanying specification and drawings in which.

Figure 1:
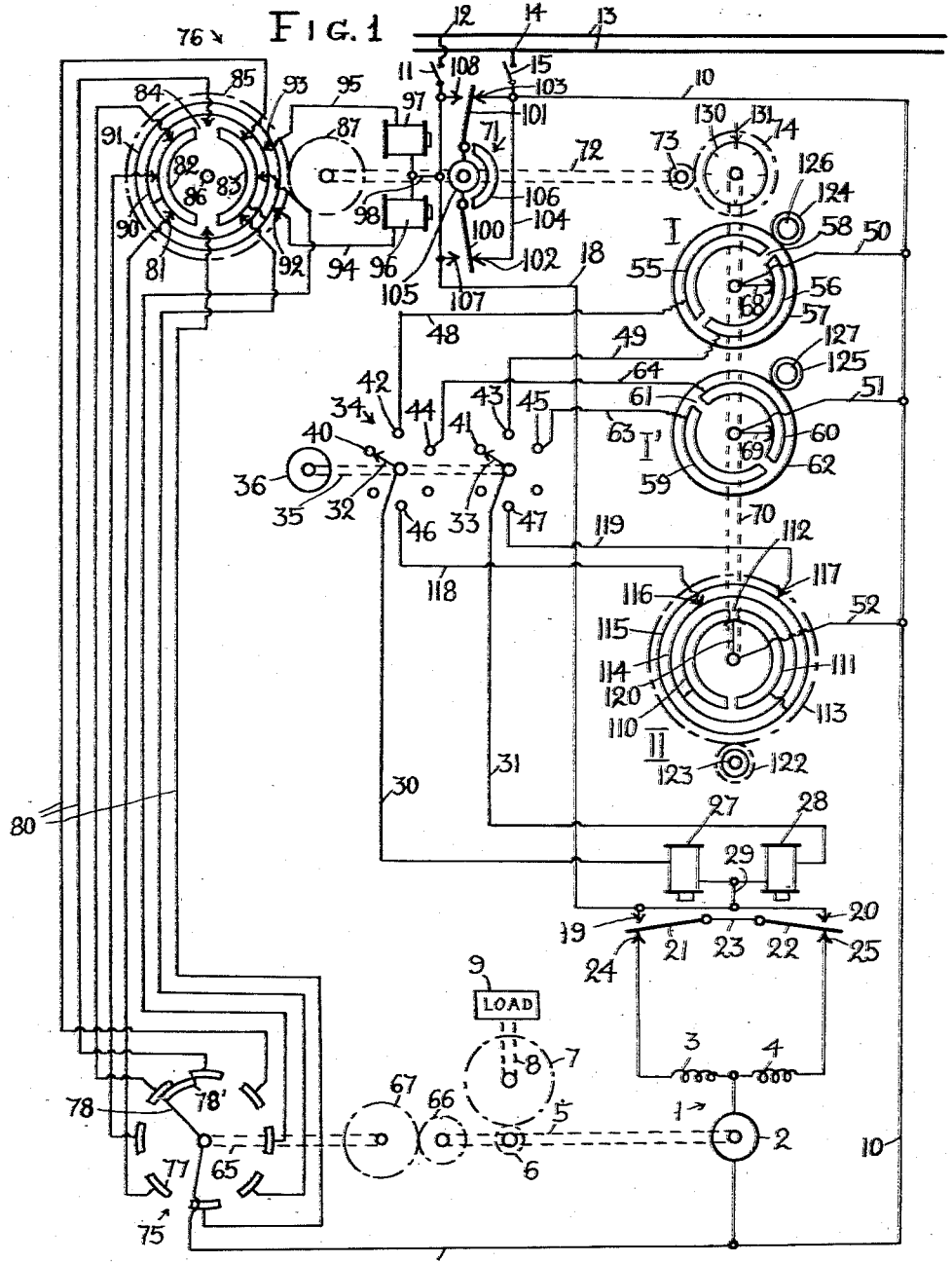
Fig. 1 is a diagrammatic view of a control apparatus according to the invention in which the remote control is accomplished by step by step control.

The remote control apparatus shown in Fig. 1 includes control units generally designated as I, I'—for placing a useful load in a predetermined position; a control unit generally designated II for placing a load in any desired position and switch means for making either one of the control units I, I'—or the control unit II operative.

In detail, the remote control apparatus according to Fig. 1, comprises a motor, generally designated 1, having an armature 2 and reversing field windings 3 and 4. The motor armature is connected by a shaft 5 through gears 6, 7 or any other suitable transmission with a shaft 8, connected with a load 9 which may be, for instance, a tuning element of a radio apparatus. One terminal of the armature 2 is connected by a lead 10 and a switch 15 to a terminal 14 of a source of current 13, the other terminal 12 of the source of current being connected by a switch 11 and lead 18 to contact points 19, 20. Relay arms 21, 22, connected by a lead 23, normally engage contact points 24, 25, and engage the points 19, 20 when attracted by relay coils 27, 28. The joined ends of these coils are connected by a lead 29 to the lead 18, and the other ends of the coils are connected to a double rotary switch 34.

This switch serves to connect either one of the units I, I' or unit II as will be explained more fully hereinafter. It comprises arms 32, 33 connected by leads 30, 31 to the coil ends.

The arms are mounted on a common shaft 35 with a knob or handle 36 for its manual operation. The arms are shown engaging blind points 40, 41, disconnecting the relays.

By turning the shaft 35, the arms are successively brought in engagement with control points 42, 43; 44, 45; 46, 47; etc. Points 42, 43 are connected by leads 48, 49 to metal segments 55, 56 of the selector I, these segments being mounted on an insulation disc 57 and separated by a gap 58. This selector is one of the control units for placing the load in one predetermined position.

The unit I', which serves to place the load in another predetermined position, comprises segments 59, 60, separated by a gap 61 and mounted on an insulation disc 62. The segments 59, 60 are connected by leads 63, 64 to the contact points 44, 45. There may be as many of these selectors or pairs of segments as there are predetermined positions for the load 9. The discs 57, 62 are held stationary in their preselected positions. For changing their positions, manually operable pinions 124, 125 are provided with knobs 126, 127.

The segments are preferably continuously engaged by contact arms 68, 69 secured to a shaft 70 for rotation therewith, and connected to the lead 10 by leads 50, 51. The shaft 70 is rotated by a motor 71 through a shaft 72 and gears 73, 74.

The rotation of the motor 71 is synchronized with the rotation of the motor 1 by means of an additional control system which comprises a transmitter 75 and a receiver 76.

The transmitter 75 comprises stationary contact points or segments 77 engaged by a movable contact arm 78 having a contact member 78'. The arm 78 is mounted on a shaft 65 coupled by gears 66, 67 with the shaft 5, and is connected by leads 79, 10 to the switch 15 and terminal 14 of the source of current 13. The contact segments 77 are connected by leads 80 with receiver contact brushes 81 engaging metal segments 82, 83 separated by a gap 84 and mounted on an insulation disc 85. The disc 85 rotates on a shaft 86 and is engaged at the periphery by a pinion 87 on the shaft 72 extending from the motor 71. The segments 82, 83 are connected to collector rings 90, 91 engaged by brushes 92, 93 connected by leads 94, 95 to the outer ends of relay coils 96, 97. The inner ends of the relay coils are joined together and connected by a lead 98 to the lead 18. Arms 100, 101 controlled by the relays normally engage contact points 102, 103 connected by a lead 104 with the switch 15 and terminal 14. The arms 100, 101 are connected with the terminals of an armature 105 of the motor 71. The motor field may be provided by a permanent field magnet 106 or field windings. The arms 100, 101, when attracted by the relay coils, engage contact points 107, 108 on the lead 18.

The control unit or selector II for placing the load in any desired position comprises a pair of metal segments 110, 111 separated by a gap 112 and mounted on an insulation disc 113. The segments 110, 111 are connected with collector rings 114, 115 engaged by brushes 116, 117 connected by leads 118, 119 to contact points 46, 47 of the rotary switch 34. They are preferably continuously engaged by a contact arm 120 mounted on the shaft 70 and connected to the lead 10 by the lead 52.

The periphery of the disc 113 is engaged by a pinion 122 manually operable by a knob 123.

The operation of an apparatus according to the invention is as follows:

Assuming it be desired to place the load in the particular predetermined position controlled by the selector I, the rotary switch 34 is then turned into a position in which the contact arms 32, 33 engage the contact points 42, 43 respectively. Assuming further that switches 11 and 15 are closed and the contact arm 68 of selector I engages the segment 56 as shown in Fig. 1, the relay coil 28 will be energized, the current passing from the terminal 14 and switch 15 through the leads 10, 50, contact arm 68, segment 56, lead 49, contact point 43, switch arm 33, lead 31, coil 28, leads 29, 18, and switch 11 to the terminal 12. The energized coil 28 will attract the relay arm 22, closing the circuit for the motor 1 from the terminal 14 and switch 15 through the lead 10, armature 2, winding 3, contact point 24, relay arm 21, lead 23, arm 22, point 20, and lead 18 to the switch 11 and terminal 12. The motor 1 will now rotate in a definite direction, causing rotation of the load 9 and of the contact arm 78.

The contact member 78' of arm 78 will successively engage the segments 77, thereby successively energizing the brushes 81. Thus if at any particular moment the member 78' engages one of the segments at the left as shown, current will pass from the terminal 14 and switch 15 through the leads 10, 79, arm 78, member 78', engaged segment 77, lead 80, corresponding brush 81, segment 82, collector ring 90, brush 93, lead 95, relay coil 97, leads 98, 18, switch 11 and terminal 12. Relay arm 101 will be attracted and current will pass from terminal 12, switch 11, lead 18, point 108, attracted relay arm 101, armature 105, relay arm 100, point 102, and lead 104 to the switch 15 and terminal 14. The motor 71 will rotate for moving the gap 84 toward the energized brush 81.

Every time the motor 1 moves the arm 78 to a subsequent segment 77, the motor 71 will rotate the disc 85 through an angular distance corresponding to the distance between two successive brushes 81 thereby causing the gap 84 to move from one brush 81 to the next one, and hence forcing the disc 85 to rotate in synchronism with the arm 78. The rotation of arm 78 and disc 85 will continue until the motor 1 is stopped when the gap 58 is bridged by the contact arm 68 thereby placing the load in a position corresponding to the position of the arm 68. It may be noted that the motor 71 will rotate at an average speed determined by the rotational speed of the arm 78.

The relay 97 will be deenergized when the gap 84 reaches the energized brush 81, and will cause the motor 71 to stop. The rotation of motor 71 will be communicated to the contact arm 68 through the shaft 72, gears 73, 74 and shaft 70 so that the extent of rotation of the contact arm 68 will have a definite relation to the extent of rotation of the contact arm 78 and of the load 9.

The ratio between the gears 73, 74, and 6, 7 is preferably such that the angular position of the load 9 always corresponds to the angular position of the arm 68 or 69.

In order to increase the accuracy of the step by step synchronization, the gear ratios 66, 67 and 87, 85 are preferably lower than the ratios of the gears 73, 74 and 6, 7 so that the disc 85 will rotate at a higher speed than the arms 68 or 69.

The gear ratio can be also selected, however, so that the load will make for example one complete revolution, for instance, in either direction for one half revolution of the contact arm 68 or 69.

It will now be obvious, that regardless of the position in which the load 9 was previously placed, the load will be always brought into a definite predetermined position when the rotary switch 34 is placed in a position for energizing the selector assigned to such position. If it is desired to move the load into another predetermined position selector I' must be energized.

With the construction of the selectors as shown, each selector can control the position of the shaft 70 within approximately one half of one revolution.

It should be noted that only two selectors I and I' are shown in Fig. 1 for clearness sake; usually a large number is employed. Several blank contact points in the rotary switch 34 are provided for such additional selectors.

The selector II which is used for placing the load in any desired position is rendered operative by turning the rotary switch 34 in a position in which the contact arms 32, 33 engage the contact points 46, 47 respectively. For causing the motor 1 to rotate to the right or the left, the knob 122 is turned in a corresponding direction for bringing one or the other of the segments 110, 111 under the contact arm 120. If, for instance, the segment 110 is brought under the arm 120, relay coil 27 will be energized as follows: Current flows from the terminal 14 and switch 15 through the leads 10, 52, arm 120, segment 110, lead 118, point 46, arm 32, lead 30, coil 27, and leads 29, 18 to the switch 11 and terminal 12. The relay arm 21 will be attracted and the motor 1 energized in the same manner as was described in connection with the operation of selector 1. The motor 1 will continue its rotation, operating the synchronizing transmitter 75 and receiver 76, until the motor 71 which is energized as described above moves the contact arm 120 into the gap 112 and bridges the same whereby both relay coils are energized and the motor 1 is stopped.

The motor 1 can be restarted by shafting the disc 113 so as to remove the gap 112 from its position under the contact arm 120.

The motor can be made to rotate rapidly or at its full normal speed by rapidly turning the arm 120 in a desired direction, or the motor speed can be considerably reduced by repeatedly displacing the gap from the bridging position by short or minute steps. Such operation of the motor by minute steps permits to place the motor and the load gradually and accurately in the desired position which may be indicated by the position of a rotary dial 130 on the shaft 70 relative to a stationary index mark 131. It is understood, of course, that the dial may be stationary and a pointer may be provided on the shaft 70.

In the system shown in Fig. 1 the load and pilot motors are synchronized in steps determined by the spacing of the segments 77. These steps can be made very small by providing a relatively large number of the segments. It should be noted that the gap 84 must be relatively wide to allow for a certain movement of the disc 85 when the relatively moving parts overrun their stopping position by inertia, without bringing the energized brush 81 in contact with one of the segments 82 and 83 which would cause a restarting of motor 71 and hence a displacement of the load.

Figure 2:
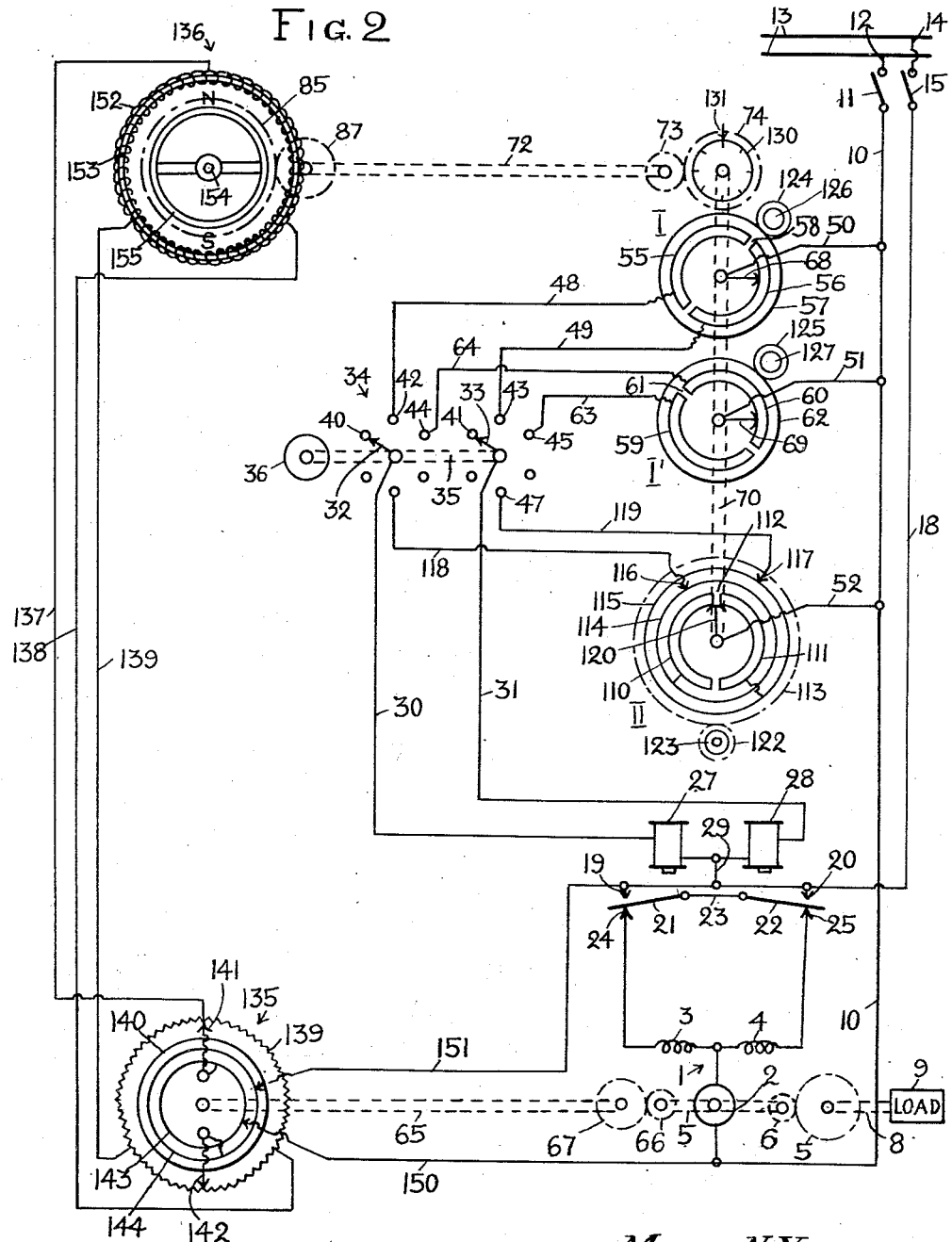
Fig. 2 is a similar view of a modified apparatus in which the remote control is accomplished by continuously synchronized motors.

A modified apparatus is shown diagrammatically in Fig. 2 in which the load motor and the pilot motor are synchronized continuously, employing for example, a "Selsyn" synchronized drive as well known in the art. The system of Fig. 2 is substantially the same as the system of Fig. 1 except as to the synchronizing device. The like parts are indicated with the same numerals as in Fig. 1.

The synchronizing device as shown in Fig. 2 comprises a transmitter 135 and a receiver 136, employed as pilot motor. Transmitter and receiver are electrically connected together by leads 137, 138 and 139. The transmitter comprises a stationary annular resistor 139 mounted concentrically with an insulation disc 140 on the shaft 65. Diametrically opposite arranged contact arms 141, 142 for dividing the resistor in two branches are mounted on the disc 140 and are connected with collector rings 143, 144 also mounted on disc 140. The arms 141, 142 slidably engage the resistor 139 thereby continuously maintaining a current through the two branches of the resistor, the arms being connected by leads 150, 151 to the leads 10, 18 respectively. The resistor 135 is connected at three equidistant points to the leads 137, 138 and 139. The other ends of these leads are connected to three equidistant points on a stationary annular coil 152 of receiver 136. Coil 152 is wound on an annular magnetic core 153, mounted concentrically with a shaft 154 supporting magnet 155. The shaft is coupled by a gear 85 engaged by a pinion 87 with the shaft 72. The ratios of the gears 73, 74 and 66, 67 are preferably so selected as to cause the angular movements of the load to correspond to the angular movements of the arms 68, 69. The ratios of the gears 87, 85 and 66, 67 are so selected as to cause relatively large displacements of the magnet 155 for relatively small displacements of the arms 68, 69, thereby increasing the accuracy of the device.

The operation of the device in Fig. 2 is similar to the operation of the device of Fig. 1 except that the magnetic axis of the magnet 155 at all times assumes a certain definite angular position, corresponding to the angular position of the axis of the contact arms 141, 142, the synchronized movement being continuous and not in steps as in Fig. 1. For every position of the contact arms 141, 142, different voltages will be applied to leads 137, 138, 139 causing the sections of the coil 152 included between these leads to be energized in such a manner that the resultant magnetic flux will be oriented in a particular direction. For every position of the arms 141, 142, therefore, there will be a corresponding position of the armature 155, which will be oriented according to the position of the arms 141, 142. Hence the armature will rotate synchronously following the rotation of the arms 141, 142.

It is understood that various other synchronizing systems can be employed with my apparatus for controlling the pilot motor by the load motor.

Figure 3:
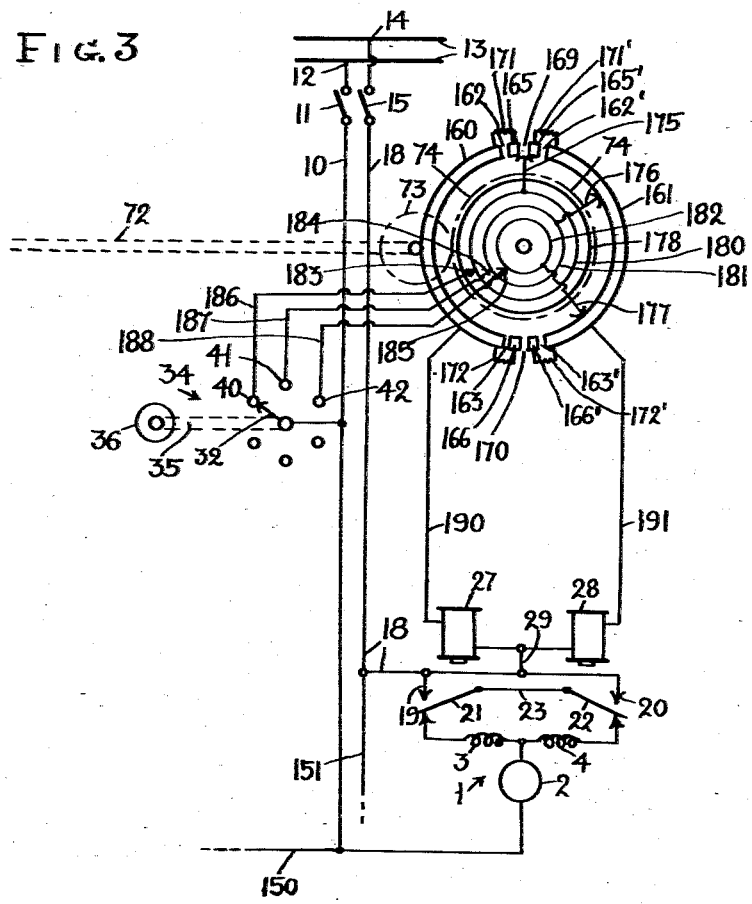
Fig. 3 is a fragmentary diagrammatic view showing another modification in which a single control unit is employed for placing the load in any one of several predetermined positions.

A single control unit or selector can also be used for placing the load in any one of several predetermined positions, as shown in Fig. 3.

Here the control elements include stationary segments 160, 161, separated by gaps 162, 162' and 163, 163' from short end portions 165, 165' and 166, 166'; the adjacent end portions being separated by gaps 169, 170. The end portions are connected with the segments by resistors 171, 171' and 172, 172'. The segments are engaged by a plurality of contact arms, in this case shown as three in number. These three contact arms, 175, 176, 177, are mounted on a rotor 178 having a gear 74 engaged by a pinion 73 on a shaft 72, which shaft corresponds to the shaft 72 of Figs. 1 and 2. The arms 175, 176, 177 are connected to collector rings 180, 181, 182, respectively, which rings are engaged by brushes 183, 184, 185, respectively. These brushes are connected by leads 186, 187, 188 with contact points 40, 41, 42 of switch 34 having contact arm 32 on shaft 35 moved manually by knob 36; the arm being connected in a lead 10 to the terminal 12 through switch 11.

The modification now being described, it will be understood, may be combined with any embodiment of the invention, for instance, that shown in Fig. 2, as indicated by the showing of the leads 150 and 151.

The segments 160, 161 are connected by leads 190, 191 to relay coils 27, 28, the joined ends of the coils being connected by leads 29, 18 to the terminal 14 of the current source 13 through switch 15.

For placing the load in a position corresponding, for instance, to the position of the arm 176, the switch 34 is operated by turning contact arm 32 until the arm engages the point 41. Current will then flow from the terminal 12 and switch 11 through the lead 10, arm 32, point 41, lead 187, brush 184, collector ring 181, arm 176, segment 161, lead 191, the coil of relay 28, and leads 29, 18 to the terminal 14 through the switch 15. This relay will attract the corresponding relay arm 22, and then, as explained in connection with Figs. 1 and 2, the motor 1 will be energized to operate the load, and rotation of the motor will continue until the arm 176 bridges the gap 169.

Because of the last previous use of the apparatus before the one just described, an arm, as the arm 175, bridged the gap; and so at the start of the motor operation just described, the gap was thus bridged. But a bridging of the gap by any arm does not interfere with operation of the apparatus. In other words, with the arm 175 bridging the gap, and with the arm 176 energized to move the load to the predetermined stopping position for the load, only the coil of relay 28 will be energized, as already stated, since the current passing through the arm 175 to the coil of the other relay 27 will be relatively small, being reduced by the two resistors 171, 171' in series. Therefore, the relay 27 will not be sufficiently energized to attract the relay arm 21. The current will be sufficient to energize the relay 28 only when there is a single resistor in the circuit. The above applies also, of course, to a situation where as the result of the last previous use of the apparatus, one of the arms bridged the gap 170.

For presetting the arms 175, 176, 177 to any predetermined stopping position for the load, any suitable type of clamping means (not shown) for repositioning the arms on the rotor 178, may be provided.

It should be understood that apparatus pursuant to the present invention may be used in connection with any suitable type.

Apparatus pursuant to the invention could be used, for example, in connection with any selector for stopping the load in a predetermined position following movement of the load through one or more revolutions or other cycles of movement or through one or more revolutions or cycles of movement and a fractional part of such revolution or cycle. Such a selector, involving the employment of a first selector unit having a movable control element for determining the number of full revolutions or cycles through which the load is to be moved, and a second selector unit having a simultaneously but more slowly moving control element for determining the fraction of a revolution or cycle through which the load is to be moved, is disclosed and claimed in my copending application Ser. No. 509,555 filed November 9, 1943, now abandoned. The control mechanism last referred to could be used pursuant to the present invention, in the case of either Fig. 1 or 2 hereof, for instance, by moving the movable control element of the first selector unit by the shaft 72 while moving the movable control element of the second selector unit by the shaft 70, with, if desired, a step-up transmission from shaft 72 to the control element moved by it, and/or a step-down transmission from shaft 70 to the control element moved by it.

It will be understood that various features and principles of each of the embodiments of the invention above described or referred to may be utilized or substituted in other embodiments.

While the invention has been described in detail with respect to certain particular preferred examples, it will be understood by those skilled in the art after understanding the invention that various changes and further modifications may be made and parts of the improvements may be used without others, without departing from the spirit and scope of the invention, and therefore, it is intended in the appended claims to cover all such changes and modifications.

I claim:

1. A control apparatus comprising a plurality of pairs of relatively movable control elements at a control point, one element of each pair comprising electrically conducting members separated by a gap, the other element of each pair comprising a contact member for engaging the conducting members; reversible drive means at a remote point for operating a useful load; moving means at the control point including a pilot motor and comprising a stationary member and a movable member, said stationary member including a plurality of contact points, one element of each pair being operatively connected to the movable member of the moving means; switch means at the control point to energize a selected pair of the control elements; means to control the direction of movement of the drive means by the position of the selected contact member relative to the corresponding gap and to stop the drive means in response to the selected contact member reaching the gap; a transmitter at the remote point comprising a stationary member and a movable member, one member of the transmitter comprising electrically conductive means including a plurality of control points, the other member of the transmitter comprising a contact arm for engaging the conductive means; means at the remote point to operate one member of the transmitter by the drive means; and electrical connections between successive contact points of the conducting means of the transmitter and corresponding contact points of the stationary member of the moving means for controlling the rotation of the pilot motor so as to cause the pilot motor to make successive movements corresponding to successive movements of the movable member of the transmitter, thereby causing the drive means to assume successive positions corresponding to the successive positions of the drive means operated control element of the selected pair, for placing the load in the desired position.

2. A control apparatus comprising a plurality of pairs of relatively movable control elements at a control point, one element of each pair comprising electrically conductive members separated by a gap, the other element of each pair comprising a contact member for engaging the conductive members; reversible drive means at a remote point for operating a useful load; moving means at the control point including a pilot motor and comprising a stationary member and a movable member, said stationary member including a plurality of contact points, one element of each pair being operatively connected to the movable member of the moving means at the control point; switch means to energize a selected pair of the control elements; means to control the direction of movement of the drive means by the position of the selected contact member relative to the corresponding gap and to stop the drive means in response to the selected contact member reaching the gap; a transmitter at the remote point comprising a stationary member and a movable member, one member of the transmitter comprising electrically conductive means including a plurality of control points, the other member of the transmitter comprising a contact arm for engaging the conductive means; means at the remote point to operate one member of the transmitter by the drive means; electrical connections between successive contact points of the conductive means of the transmitter and corresponding contact points of the stationary member of the moving means, the movable member of the moving means comprising conducting members separated by a gap; electrical means to successively energize the stationary contact points of the moving means by the contact arm of the transmitter successively engaging the contact points thereof; means to control the direction of rotation of the pilot motor by the relative position of the gap and the energized contact point of the moving means; and means at the control point to stop the pilot motor in response to the energized contact point being at the gap, thereby causing the drive means to assume successive positions corresponding to the successive positions of the drive means operated control element of the selected pair, for placing the load in the desired position.

3. A control apparatus comprising a pair of relatively movable control elements at a control point; switch means at the control point to energize the control elements; first drive means at the control point to move one of the control elements, the other element being stationary; second drive means at a remote point arranged to operate a useful load; means to control the second drive means by the relative position of the control elements and to render both the drive means inoperative for the purposes aforesaid in response to the control elements reaching a predetermined relative position; a second pair of relatively movable control elements at the control point electrically controlling the first drive means; and means at the remote point controlled by the second drive means and controlling the relative position of the second pair of relatively movable control elements for effecting corresponding movements of both the drive means, thereby placing the second drive means in a position corresponding to the predetermined relative position of the first pair of relatively movable control elements.

4. A control apparatus comprising a plurality of selectors at a control point; each selector comprising a pair of control elements, one element of each pair being movable, the other being stationary, each pair comprising electrically conducting means having a neutral point and a contact member for engaging the conducting means; a reversible drive means including an electric motor at a remote point for moving a useful load; a second reversible drive means including a pilot motor at the control point for simultaneously moving the movable elements of all the pairs; switch means at the control point to selectively energize one of the selectors; means to electrically control the load motor by the position of the contact member of the selected pair at one or the other side of the neutral point and to stop the load motor in response to the neutral point being occupied by the said contact member; a pair of relatively movable control members at the control point for electrically controlling the pilot motor; and means at the remote point controlled by the load motor and electrically controlling the relative position of the relatively movable control members for effecting corresponding movements of both the motors, thereby placing the load in a position as determined by the selected selector.

5. A control apparatus as in claim 4, in combination with means at the control point for independently changing the position of the stationary control element of each of said selectors, thereby varying the stopping position of the load motor as determined by the selected selector.

MICHEL N. YARDENY.

REFERENCES CITED

The following references are of record in the file of this patent:

UNITED STATES PATENTS

| Number | Name | Date |
|--------|------|------|
| 714,862 | Buck | Dec. 2, 1902 |
| 835,382 | Willard | Nov. 6, 1906 |
| 993,814 | Barnum | May 30, 1911 |
| 1,042,692 | Kramer | Oct. 29, 1912 |
| 1,674,143 | Stroud et al. | June 19, 1928 |
| 1,979,588 | Vreeland | Nov. 6, 1934 |
| 2,108,607 | Nelson | Feb. 15, 1938 |
| 2,342,717 | Yardeny | Feb. 29, 1944 |